US012456215B2

(12) United States Patent
Klug et al.

(10) Patent No.: US 12,456,215 B2
(45) Date of Patent: Oct. 28, 2025

(54) SPACECRAFT SYSTEM FOR GENERATING A 3-D MAP OF AN OBJECT IN NEAR REAL-TIME UNDER NON-IDEAL LIGHTING CONDITITONS

(71) Applicant: Falcon Exodynamics, Inc., El Segundo, CA (US)

(72) Inventors: Michael Klug, Redondo Beach, CA (US); Joseph Vermeersch, Hermosa Beach, CA (US); Justin Pank, El Segundo, CA (US); Scott Plantenga, El Segundo, CA (US); Brayamh Lopez, El Segundo, CA (US); Scott Dow, El Segundo, CA (US); Adriel Bustamante, Jurupa Valley, CA (US)

( * ) Notice: Subject to any disclaimer, the term of this patent is extended or adjusted under 35 U.S.C. 154(b) by 0 days.

(21) Appl. No.: 19/040,133

(22) Filed: Jan. 29, 2025

(65) Prior Publication Data

US 2025/0259324 A1    Aug. 14, 2025

Related U.S. Application Data

(60) Provisional application No. 63/551,358, filed on Feb. 8, 2024.

(51) Int. Cl.
*G06T 7/579* (2017.01)
*B64G 1/66* (2006.01)
(Continued)

(52) U.S. Cl.
CPC ................ *G06T 7/579* (2017.01); *B64G 1/66* (2013.01); *H04N 23/20* (2023.01);
(Continued)

(58) Field of Classification Search
CPC ............ G01C 21/3461; G01C 21/3833; B64C 39/024; G05D 2109/20; G05D 1/6445;
(Continued)

(56) References Cited

U.S. PATENT DOCUMENTS 10,853,942 B1 * 12/2020 Boyd ........................ G06T 7/80
11,119,478 B2 * 9/2021 McArthur ............. G01S 13/931
(Continued)

OTHER PUBLICATIONS

Volpe R, Sabatini M, Palmerini GB. Pose and shape reconstruction of a noncooperative spacecraft using camera and range measurements. International Journal of Aerospace Engineering. 2017;2017(1):4535316.*

(Continued)

*Primary Examiner* — Phu K Nguyen

(57) ABSTRACT

An apparatus for generating a 3D image map comprises a camera, mounted to a spacecraft, configured to capture plurality of images of an object from a plurality of positions about the object. An unstructured light source for illuminating the object to capture the plurality of images of the object. A gimbal mechanism for mounting the camera and the unstructured light source and moving the camera to a plurality of positions. Image processing circuitry configured to process the plurality of images of the object and generate a 3D image map of the of the object responsive to the plurality of image of the object. The image processing circuitry further having a processor configured to implement a shape-from-motion algorithm for generating the 3D image map responsive to the plurality of images of the object.

20 Claims, 8 Drawing Sheets

(51) Int. Cl.
  *H04N 23/20* (2023.01)
  *H04N 23/695* (2023.01)
  *H04N 23/74* (2023.01)

(52) U.S. Cl.
  CPC ........... *H04N 23/695* (2023.01); *H04N 23/74* (2023.01); *G06T 2207/10032* (2013.01)

(58) Field of Classification Search
  CPC .. G08G 5/55; G08G 5/30; G08G 5/57; G08G 5/59
  USPC ......................................................... 345/418
  See application file for complete search history.

(56) References Cited

U.S. PATENT DOCUMENTS

| | | | | |
|---|---|---|---|---|
| 11,573,544 | B2* | 2/2023 | Henry | G05D 1/0088 |
| 2023/0146926 | A1* | 5/2023 | Gorantla | G06T 7/70 |
| | | | | 701/450 |
| 2023/0213610 | A1* | 7/2023 | Eberspach | G06V 40/166 |

OTHER PUBLICATIONS

Opromolla R, Fasano G, Rufino G, Grassi M. A review of cooperative and uncooperative spacecraft pose determination techniques for close-proximity operations. Progress in Aerospace Sciences. Aug. 1, 2017;93:53-72.*

Lichter MD, Dubowsky S. State, shape, and parameter estimation of space objects from range images. InIEEE International Conference on Robotics and Automation, 2004. Proceedings. ICRA'04. 2004 Apr. 26, 2004 (vol. 3, pp. 2974-2979). IEEE.*

Wang B, Li S, Mu J, Hao X, Zhu W, Hu J. Research advancements in key technologies for space-based situational awareness. Space: Science & Technology. Jun. 18, 2022.*

Klionovska K, Ventura J, Benninghoff H, Huber F. Close range tracking of an uncooperative target in a sequence of photonic mixer device (PMD) images. Robotics. Jan. 10, 2018;7(1):5.*

Schnitzer F, Janschek K, Willich G. Experimental results for image-based geometrical reconstruction for spacecraft rendezvous navigation with unknown and uncooperative target spacecraft. In2012 IEEE/RSJ International Conference on Intelligent Robots and Systems Oct. 7, 2012 (pp. 5040-5045). IEEE.*

Murthy K, Shearn M, Smiley BD, Chau AH, Levine J, Robinson MD. SkySat-1: very high-resolution imagery from a small satellite. InSensors, systems, and next-generation Satellites XVIII Oct. 7, 2014 (vol. 9241, pp. 367-378). SPIE.*

Lepcha DC, Goyal B, Dogra A, Goyal V. Image super-resolution: A comprehensive review, recent trends, challenges and applications. Information Fusion. Mar. 1, 2023;91:230-60.*

Ishiguro M, Nakamura R, Tholen DJ, Hirata N, Demura H, Nemoto E, Nakamura AM, Higuchi Y, Sogame A, Yamamoto A, Kitazato K. The Hayabusa spacecraft asteroid multi-band imaging camera (AMICA). Icarus. Jun. 1, 2010;207(2):714-31.*

Awad MM. A Morphological Model for Extracting Road Networks from High-Resolution Satellite Images. Journal of Engineering. 2013;2013(1):243021.*

Xiang A, Zhang L, Fan L. Shadow removal of spacecraft images with multi-illumination angles image fusion. Aerospace Science and Technology. Sep. 1, 2023;140:108453.*

Maass B. Robust approximation of image illumination direction in a segmentation-based crater detection algorithm for spacecraft navigation. CEAS Space Journal. Dec. 2016;8:303-14.*

\* cited by examiner

SPACECRAFT SYSTEM FOR GENERATING A 3-D MAP OF AN OBJECT IN NEAR REAL-TIME UNDER NON-IDEAL LIGHTING CONDITITONS

CROSS-REFERENCE TO RELATED APPLICATIONS

This application claims benefit of U.S. Provisional Application No. 63/551,358, filed Feb. 8, 2024, entitled SPACECRAFT SYSTEM FOR GENERATING 3-D MAP OF AN OBJECT IN NEAR REAL-TIME UNDER NON-IDEAL LIGHTING CONDITIONS, the specifications of which is incorporated by reference herein in their entirety.

TECHNICAL FIELD

The present invention relates to 3D image mapping of an object, and more particularly, to a system for generating a 3D map of an object in real-time under nonideal lighting conditions.

BACKGROUND

Spacecraft operations often require supporting rendezvous of the spacecraft with other spacecraft, proximity operations with other spacecraft or other objects in space, docking with other spacecraft and landing the spacecraft on objects. In order to accomplish docking, repair or characterization of an object in space, 3D knowledge of the object is required to safely navigate around and potentially interact with the space object. For these operations to be automatically controlled, it is necessary to provide a 3D rendering and mapping the surface of an unknown space object or perform terrain elevation mapping of a planetary surface.

Existing solutions use active ranging techniques to perform a mapping of space objects or planetary terrain. Existing approaches for performing 3D mapping of objects under nonideal lighting conditions include the use of RF ranging techniques such as radar to measure the distance from a radar source to various points on a target object and generating a map of the radar pulse/distance returns. Other solutions involving the use of optical ranging such as LiDAR measure the distance from a LiDAR source to various points on the target and then generating a map of the LiDAR/pulse distance returns.

Structured light approaches using a projected pattern of light onto the surface of an object of interest to measure the difference between the distortion of the resulting projection on the object and the original light pattern transmitted to the object and determine the difference in height of areas across the target surface. All of these methods typically require expensive, complex and well calibrated hardware setups in order to perform the 3D mapping processes. A system enabling the creation of 3D images of objects having smaller size, weight, power and cost than those associated with traditional approaches would be greatly beneficial. This solution would especially help with low cost missions such as capturing and removing space junk.

SUMMARY

The present invention, as disclosed and described herein, in one embodiment thereof, comprises an apparatus for generating a 3D image map comprising a camera, mounted to a spacecraft, configured to capture a plurality of images of an object from a plurality of positions about the object. An unstructured light source for illuminating the object captures the plurality of images of the object. A gimbal mechanism for mounting the camera and the unstructured light source and moving the camera and unstructured light source to a plurality of positions. Image processing circuitry processes the plurality of images of the object and generates a 3D image map of the of the object responsive to the plurality of images of the object. The image processing circuitry further has a processor configured to implement a shape-from-motion algorithm for generating the 3D image map responsive to the plurality of images of the object.

BRIEF DESCRIPTION OF THE DRAWINGS

For a more complete understanding, reference is now made to the following description taken in conjunction with the accompanying Drawings in which.

DETAILED DESCRIPTION

Figure 1:
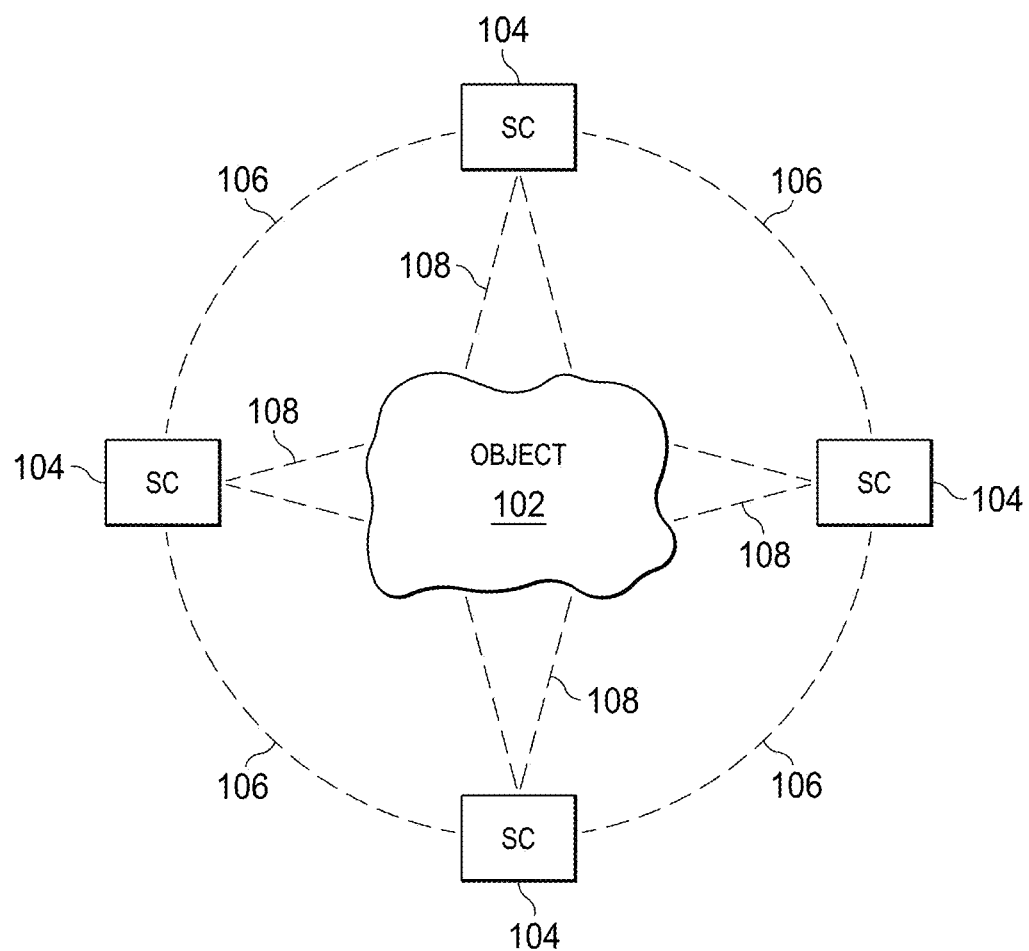
FIG. 1 illustrates a manner in which a spacecraft may take multiple images of an object to enable these images to create a 3D map of the object.

Referring now to the drawings, wherein like reference numbers are used herein to designate like elements throughout, the various views and embodiments of a spacecraft system for generating a 3D map of an object in near real-time under nonideal lighting conditions are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated the manner in which an object 102 may be surveyed (3D mapped) by a spacecraft 104. The object 102 may comprise any celestial body moving through outer space on which the spacecraft 104 may desire to land or may comprise a man-made object such as a spacecraft, satellite, space junk, etc. with which the spacecraft 104 may desire to dock, contact or rendezvous. The object 102 when located within nonideal lighting conditions may make generating a 3D map of the surface of the object very difficult. In order to generate a 3D map of the surface of the object 102, the spacecraft 104 moves in a path 106 about the area of interest upon the object 102. The area of interest can be the entire surface of the object 102 or may comprise only certain areas of the object. In each of multiple positions, the spacecraft would take an image as indicated generally at 108 of the object 102. In practice, these images 108 would overlap and the combined images 108 can be processed in order to generate the 3D map of the area of interest of the object 102 using various image processing techniques.

Figure 2:
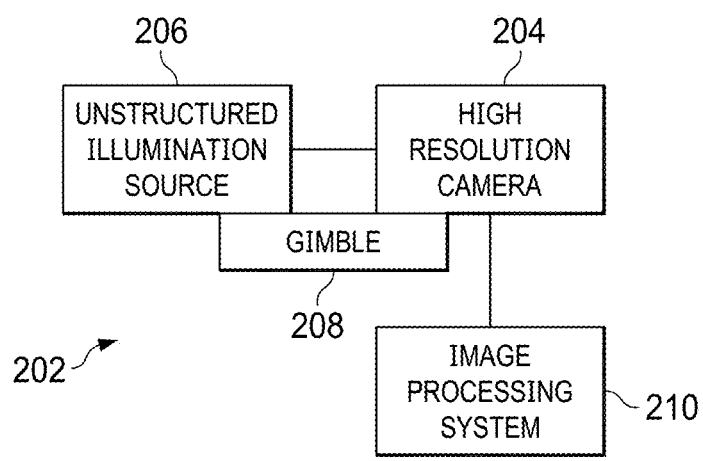
FIG. 2 illustrates a block diagram of a system for generating a 3D map of an object.

Referring now to FIG. 2, there is illustrated a block diagram of a general version of the 3D mapping system 202 for generating a 3D map of an object. The 3D mapping system 202 comprises an integrated hardware and software system hosted on a moving platform such as a spacecraft. The 3D mapping system 202 includes a high-resolution camera 204 and an unstructured light source 206. In other implementations, an infrared or other camera is used when use can be made of the object's self-illumination in which case the unstructured light source 206 is optional. Each of the high-resolution camera 204 and the unstructured light source 206 are mounted upon a gimbal 208 enabling the camera 204 and light source 206 to be adjusted to various positions. An unstructured light source 206 comprises a light source that emits light without a specific pattern or arrangement. The unstructured light waves from the unstructured light source 206 are not organized in a predictable way, unlike a structured light source which might project a specific pattern or grid of light to capture 3D information about an object. An unstructured light source 206 provides a diffused, non-directional light like a regular light bulb or sunlight.

The high-resolution camera 204 is sensitive in the same spectrum as the unstructured light source 206. In alternative embodiments, the high-resolution camera 204 may take advantage of an object's self-illumination using for example an infrared camera. The gimbal 208 is an optional structure that enables pointing of the camera 204 and light source 206 in a desired direction. An image processing system 210 comprises hardware and software for receiving multiple images taken by the high-resolution camera 204 and processing these multiple images to generate a 3D map of the object 102. The 3D mapping system 202 may include an onboard computer that utilizes structure/shape-from-motion algorithms in order to generate the 3D map from the multiple images taken by the camera. The 3D mapping system 202 enables the generation of 3D maps of an object 102 from the multiple images.

Figure 3:
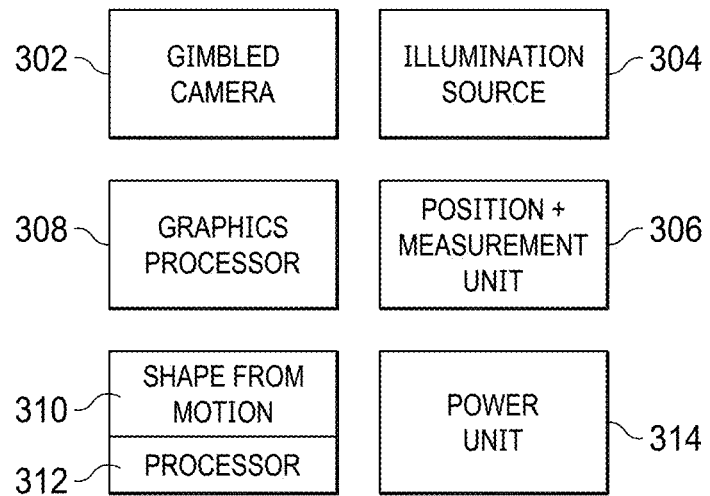
FIG. 3 illustrates a block diagram of a system for generating a 3D map of an object including the image processing components.

Referring now to FIG. 3, there is more particularly illustrated the image processing components of the 3D mapping system 202 of FIG. 2. The system is useful in any spacecraft and may be used to perform 3D mapping, proximity operations, rendezvous, docking or landing operations. As described previously, the 3D mapping system 202 includes a camera 302 that may be positioned in a variety of direction. As noted previously, the camera 302 could be in a fixed position rather than a gimbaled camera. The gimbaled camera 302 captures resolved images of a subject object at a programmable rate as the spacecraft moves around the object. Illumination source 304, if present, shines non-structured light onto the surface of the object which is being 3D mapped. The illumination source 304 is powered by the power unit 314 when nonideal lighting conditions are detected. However, a lighting source may not be utilized in a situation where another type of camera such as an infrared camera is utilized that does not require illumination of the object by the lighting source or if sufficient light is present.

A positioning and measurement unit 306 may optionally be included to determine a position of the 3D mapping system 202 and a location of the images that are taken by the 3D mapping system. This position information may be used to assist in the 3D image mapping from the multiple individual images taken of a particular object. A general purpose graphics processor 308 may be included with the camera 302 in order to process the multiple images being taken by the camera 302. The 3D mapping is carried out by a shape-from-motion algorithm 310 implemented in conjunction with a processor 312. The shape-from-motion algorithm 310 receives the individual images from the camera 302 and the associated graphics processor 308 generates the 3D image map. The 3D mapping system 202 may be self-contained such that it does not rely upon power or data from the spacecraft on which the system is implemented. In this case, the 3D mapping system 202 would include a power unit 314 enabling powering the various components of the 3D mapping system for generating the 3D maps.

Figure 4:
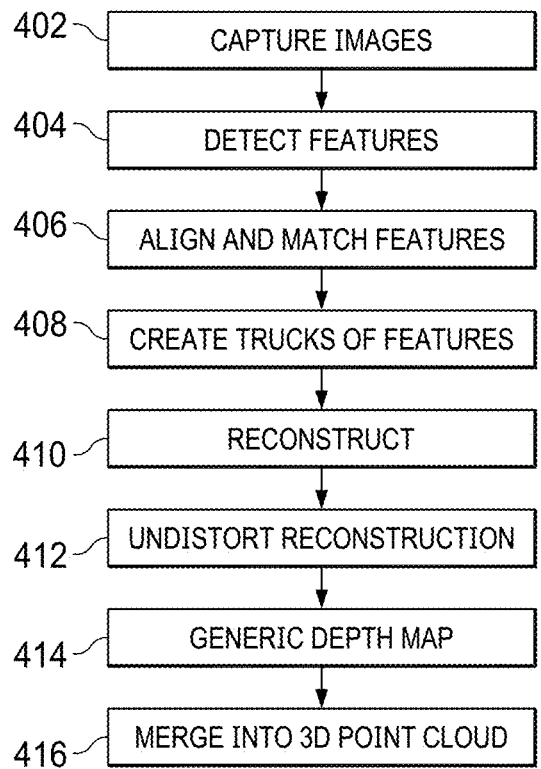
FIG. 4 illustrates a flow diagram of the process for generating a 3D map of an object.

Referring now to FIG. 4, there is illustrated of the process for generating a 3D map from a plurality of images taken by the 3D mapping system 202 described herein above. The camera 302 initially captures multiple images at step 402 from the surface of the object being mapped. At least two images are required. However, in most cases, a much greater number of images will be captured. The images are time tagged and optionally tagged with position measurement information from the position and measurement unit 306 at the time of capture. Once the images have been captured, the image processing software determines the shape from motion algorithm 310 which will detect at step 404 features within the multiple images. Next, the shape from motion algorithm 310 will align and match the detected features between the various images at step 406. The aligned and matched features will be used to create tracks of the features at step 408 within physical space. The shape from motion algorithm 310 will then reconstruct the physical motion of the camera 302 and determine feature tracks between images at step 410. The reconstruction will be undistorted at step 412. From the undistorted reconstruction at step 412, a depth map is generated at step 414 which may be merged into a 3D point cloud at step 416.

Figure 5:
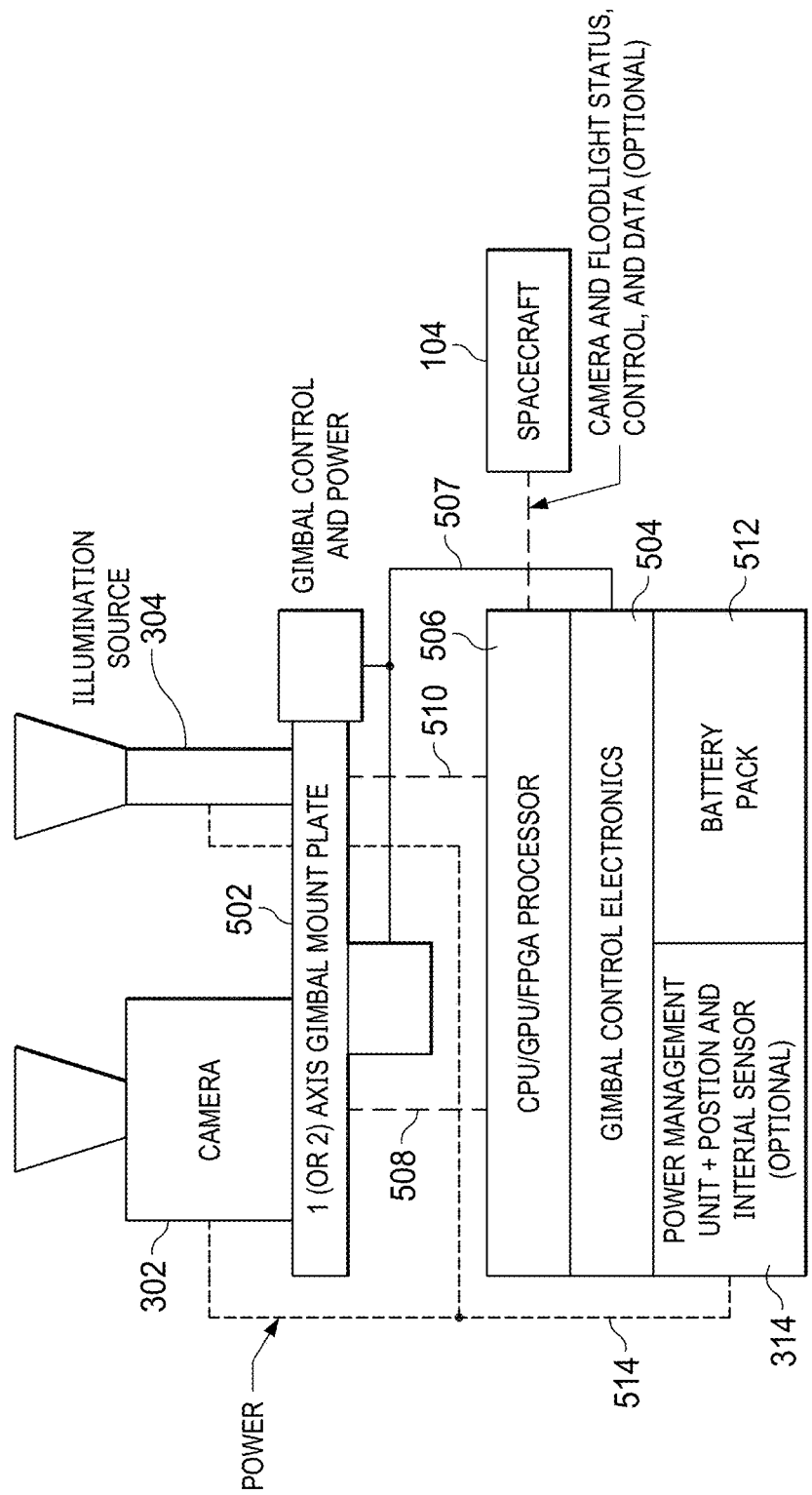
FIG. 5 illustrates a further embodiment of the system for generating a 3D map of an object implemented with respect to a spacecraft.

Referring now to FIG. 5, there is illustrated the interconnection of the various system components illustrated with respect to FIG. 3. The camera 302 and illumination source 304 are each positioned on a one or two axis gimbal mount plate 502. The gimbal mount plate 502 is controlled by gimbal control electronics 504 over a control line 507. The gimbal control electronics 504 position the camera 302 and illumination source 304 in a desired position in order to capture images of the object being 3D mapped. The control line 507 provides both control and power signals from the gimbal control electronics 504 to the gimbal mount plate 502.

Processing circuitry 506 is connected to the camera 302 via a control line 508 and to the illumination source 304 via a control line 510. The processing circuitry 506 may comprise a CPU, GPU or FPGA processor for controlling capture of multiple images by the camera 302. The control signals provided via control line 508 instructs the camera 302 when to take the multiple images of the surface of the object which is being 3D mapped by the 3D mapping system 202. The control signals received over the control line 510 instruct the illumination source 304 when to illuminate the surface of the object such that the camera 302 may capture images of an illuminated object. The processing circuitry 506 will process each of the multiple images that are captured by the camera 302 in the manner described with respect to the flow diagram of FIG. 3 in order to generate the 3D map of the object. A spacecraft 104 receives from the processing circuitry 506 camera and floodlight status information, control information and image data.

The power management unit 314 controls the flow of power from a battery pack 512 to the camera 302 and illumination source 304 via power lines 514. Position and inertial sensor circuitry 306 are associated with the camera 302 and the processing circuitry 506 in order to enable position and timestamp information to be associated with each of the images captured by the camera 302.

Figure 6:
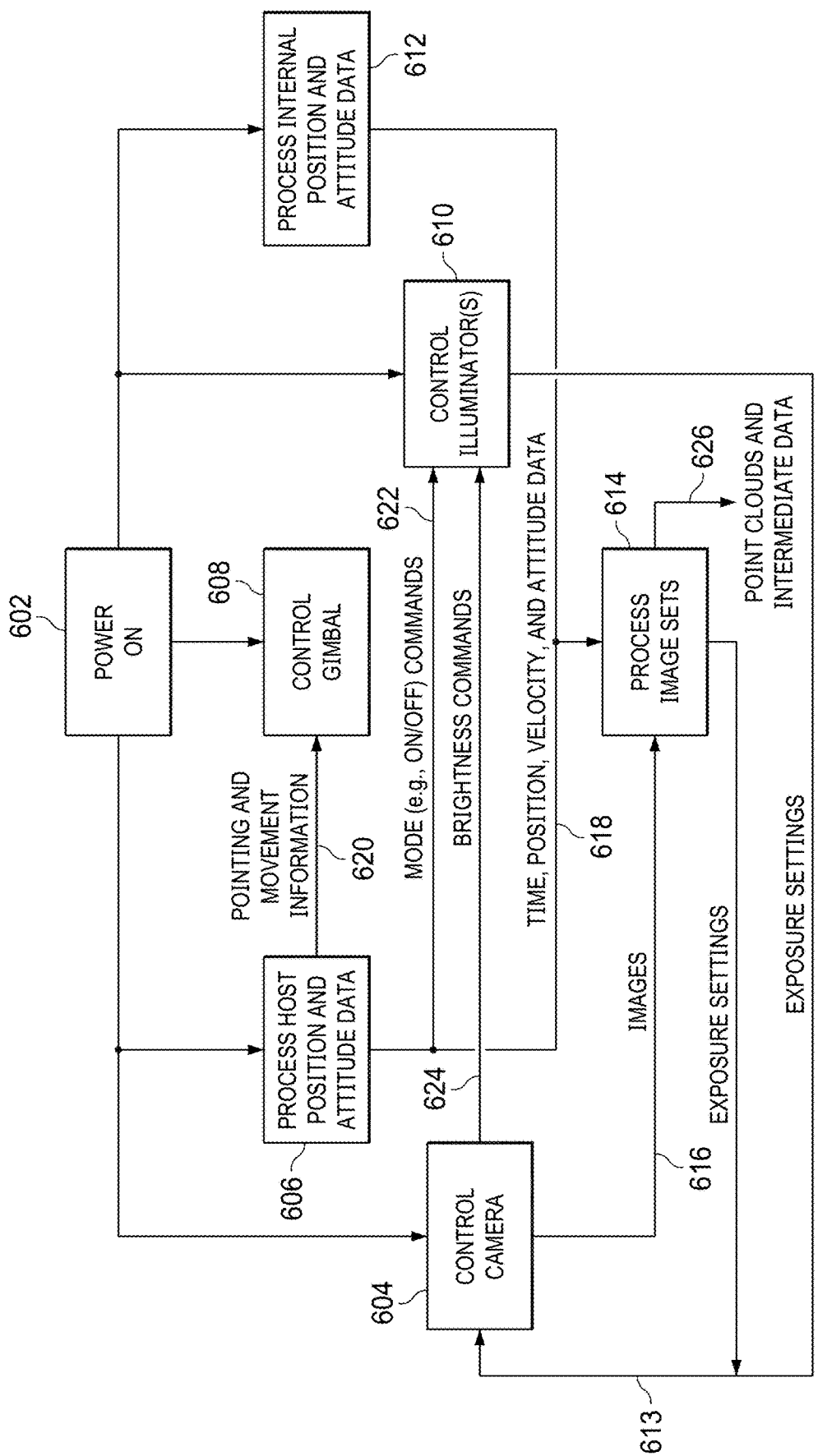
FIG. 6 illustrates the control processes of a system for generating a 3D map of an object.

Referring now to FIG. 6, there is illustrated the software processing associated with generation of a 3D map of the surface of an object from multiple images of the object taken by a camera 302. Once the system is powered on at 602, power is provided from the battery pack 512 to control the camera at 604, to process hosts position and attitude data at 606, to control the gimbal at 602, to control the illumination source at 610 and to process internal position and attitude data at 612. The camera is controlled at 604 responses to the power and exposure settings received from the process image set at 614 and the illuminator control 610. The camera 302 will capture images responsive to the provided exposure settings and provide images 616 for processing at the process image sets 614. The image sets 616 received from the camera control 604 are processed at 614 responsive to the received images 616 and the time, position, velocity and attitude data 618 provided from the process host position and attitude data 606 and the process internal position and attitude data 612. The process host position and attitude data 606 also provides position and movement information 620 to control the gimbal at 608. The illumination sources are controlled at illuminator control 610 responsive to mode on/off commands 622 from the process hosts position and attitude data and brightness commands 624 from the camera control 604. This enables the establishment of the exposure settings 613 for the camera control 604. The process image sets 614 provide point clouds and intermediate data 626 responsive to the multiple received image sets 616. All of the images received from the camera 302 are combined into point cloud data and the images processed.

Figure 7:
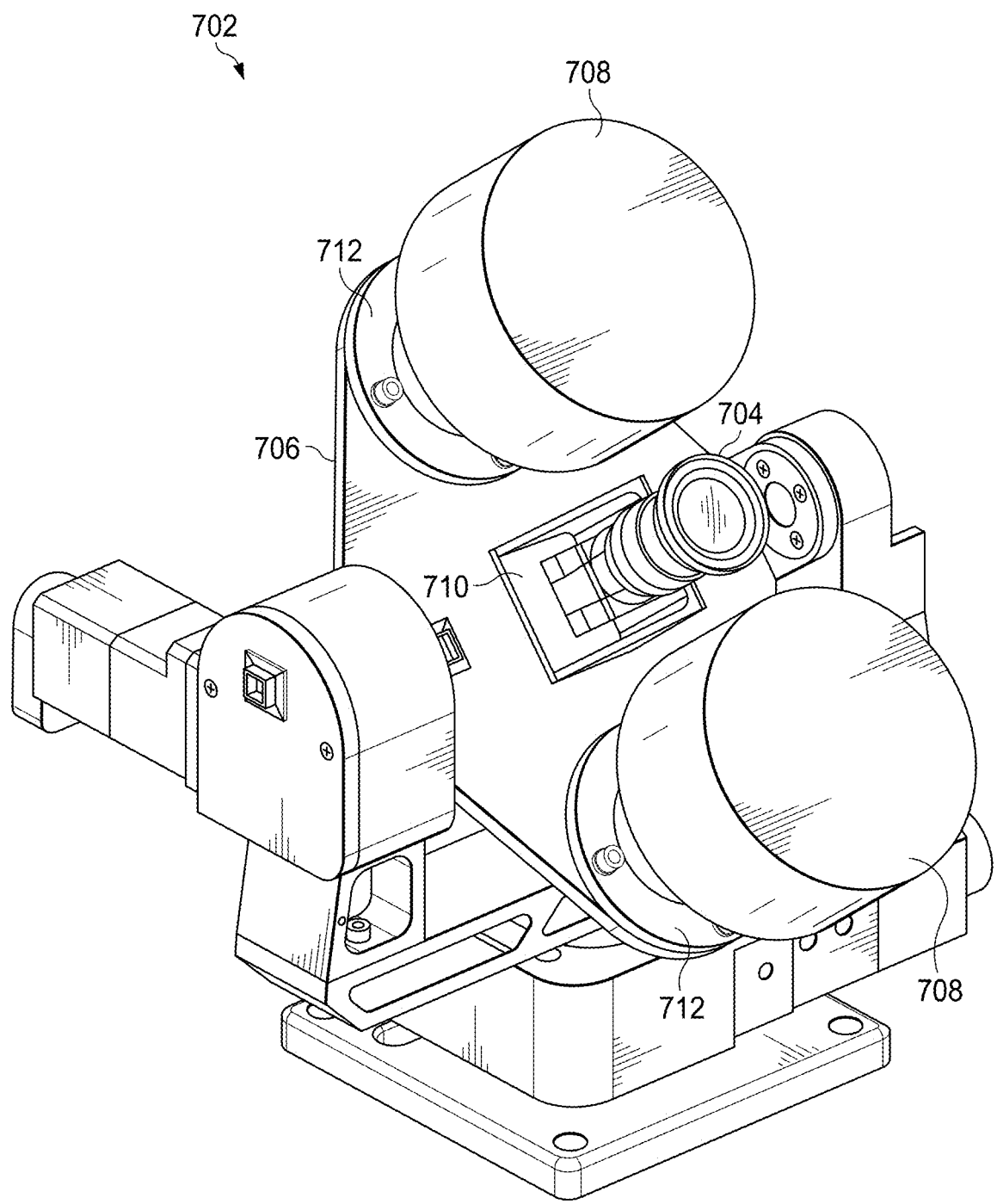
FIG. 7 illustrates a perspective view of one embodiment of a first side of the system for generating a 3D map of an object.

Referring now to FIG. 7, there is provided perspective view of one embodiment of the of the 3D mapping system 702. As noted before, a camera 704 is mounted on a gimbal plate 706 along with a pair of unstructured light sources 708. The use of the gimbal camera 704 reduces dependency on host spacecraft pointing. The camera 704 is held in place by a camera bracket 710 while the unstructured illumination sources 708 are secured to the gimbal plate 706 via light brackets 712. Other configurations of the system may also be used.

Figure 8:
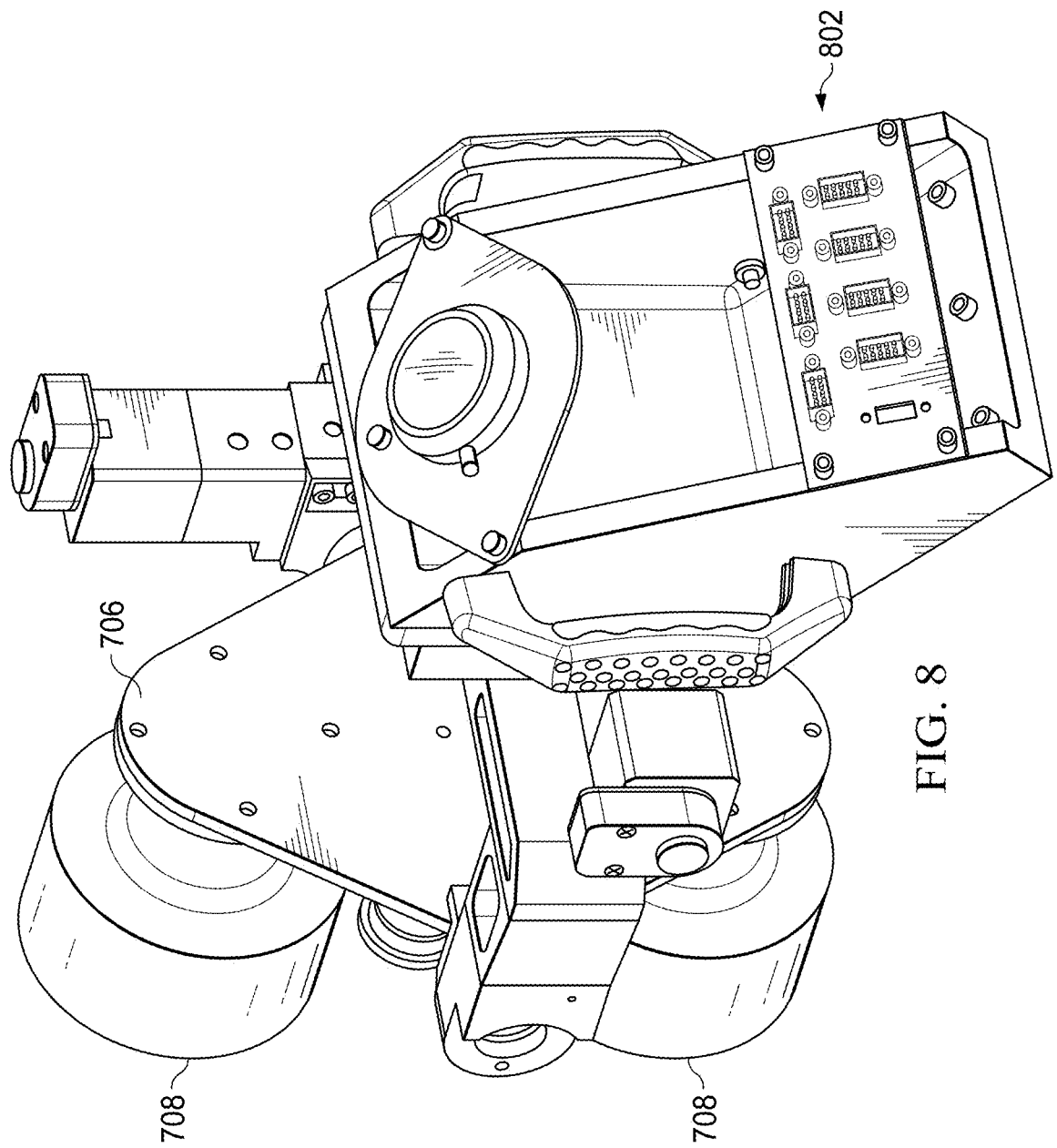
FIG. 8 illustrates a perspective view of one embodiment of a second side of the system for generating a 3D map of an object.

Referring now to FIG. 8, there is illustrated one embodiment of the backside of the 3D mapping system 702 by which the gimbal plate 706 and associated camera 704 and unstructured illumination sources 708 are mounted to a structure such as a spacecraft using a harness bracket 802. Harness bracket 802 comprises an external harness bracket that mounts to angle brackets and supports of, for example, a spacecraft. Other configurations of the system may also be used.

Figure 9:
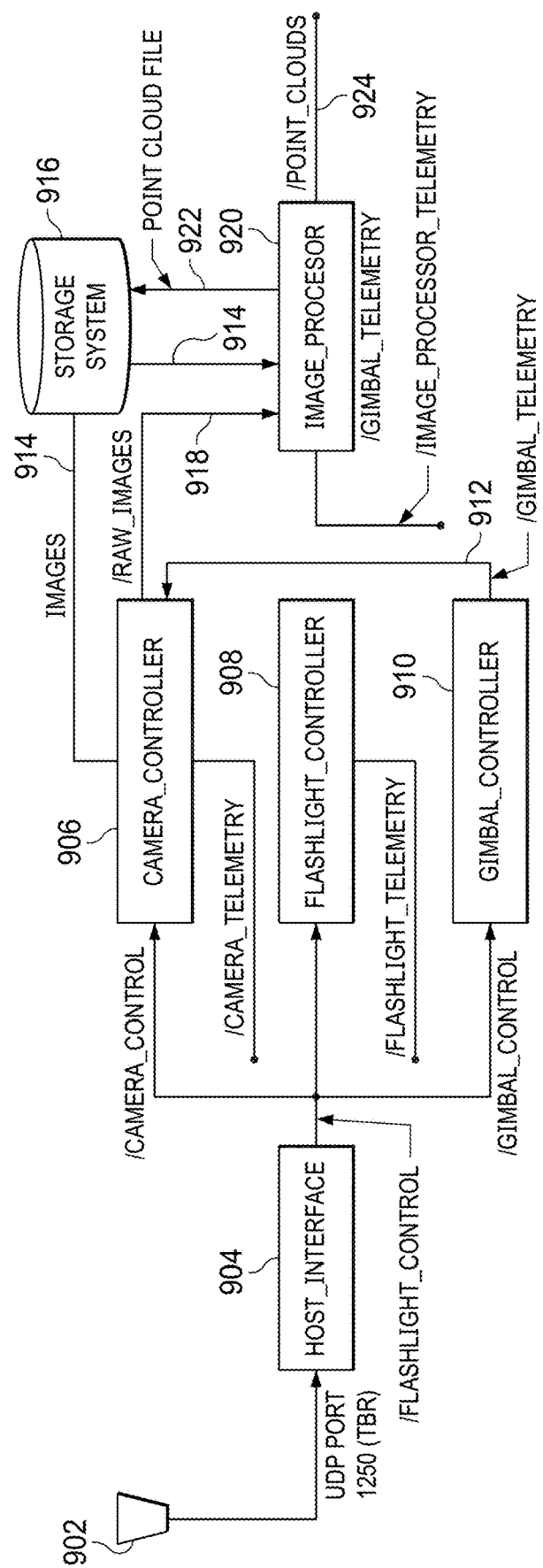
FIG. 9 illustrates a block diagram of one embodiment of the system controllers for the system for 3D mapping of an object.

Referring now to FIG. 9, there is illustrated one embodiment of the controller architecture for the 3D mapping system 702. The 3D mapping system 702 interconnects with the spacecraft through data connection 902. The connection 902 provides signals to and from a host interface 904. The host interface 904 enables the provision of control signals to each of a camera controller 906 that controls the camera, an illumination controller 908 that controls the unstructured illumination source/sources and the gimbal controller 910 that controls the positioning of the camera and the illumination source via the gimbal. The gimbal controller 910 provides gimbal telemetry control signals to the camera controller 906 in order to position the camera in a desired position. The camera controller 906 upon receiving the recorded images from the camera stores the images 914 on a storage system 916. The raw image data 918 is also provided from the camera controller 906 to an image processor 920. The image processor 920 creates the point cloud file 922 comprising the 3D image mapping that may be stored on the storage system 916 or output via an output 924. The image processor 920 in addition to the raw image data 918 from the camera controller 906 may utilize the image file 914 stored within the storage system 916.

Figure 10:
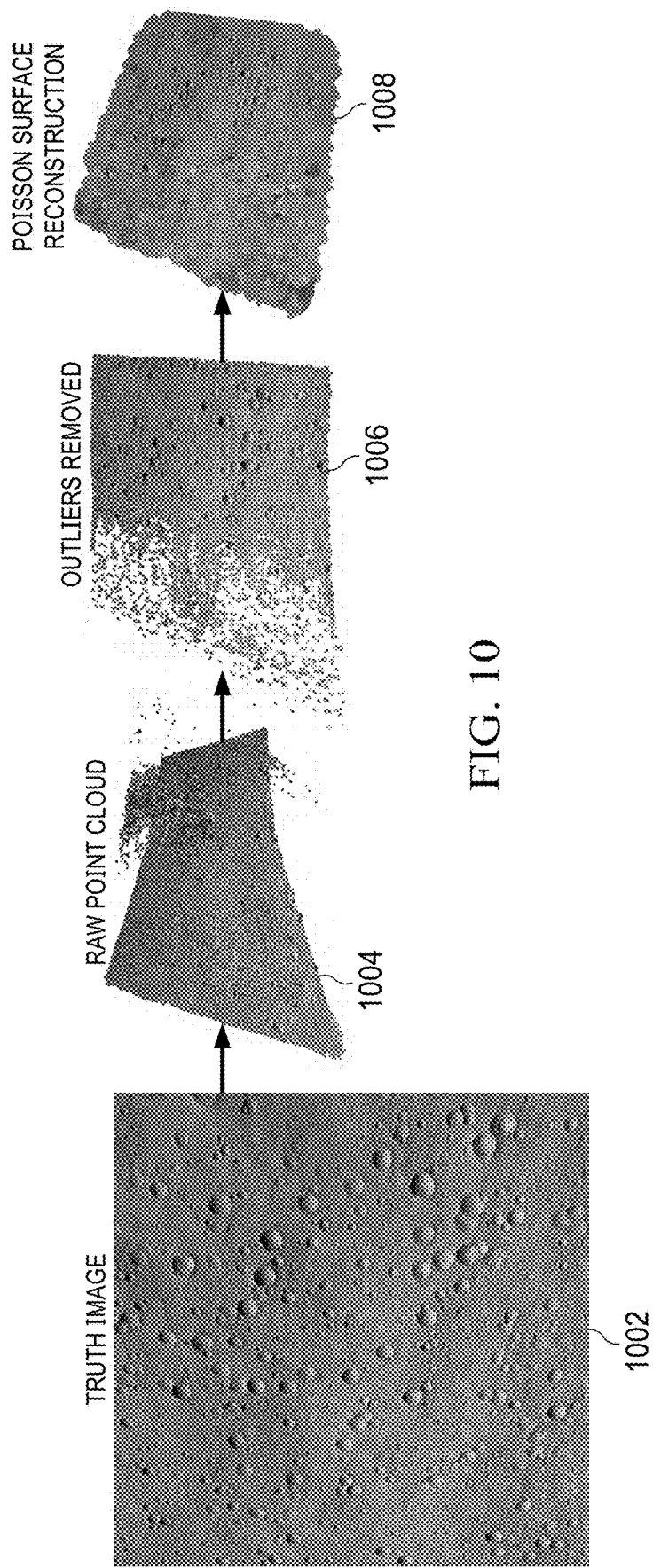
FIG. 10 illustrates the generation of an image using the system described herein.

Referring now to FIG. 10, there is illustrated one manner for generating a 3D image map from the multiple sets of image data taken by the camera. Initially, the actual image data 1002 is first processed into a raw point cloud image 1004. The raw point cloud image 1004 has outliers removed as shown at 1006 and then a Poisson surface reconstruction may be made of the image as shown at step 1008. The example of 3D mapping processing illustrated in FIG. 10 comprises merely one example thereof. It will be appreciated that other 3D image processing techniques using the 3D mapping system described herein above may be utilized.

It will be appreciated by those skilled in the art having the benefit of this disclosure that this spacecraft system for generating a 3D map of an object in near real-time under nonideal lighting conditions provides an improved manner of generating 3D maps in low light environments. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for generating a 3D image map of an object, comprising:
   a high-resolution camera within a spacecraft configured to capture plurality of overlapping images of the object from a plurality of positions about the object;
   an unstructured light source within the spacecraft for illuminating the object with light not having a specific pattern or arrangement to capture the plurality of overlapping images of the object; and
   image processing circuitry within the spacecraft configured to process the plurality of overlapping images of the object and generate a 3D image map of the of the object responsive to the plurality of overlapping images of the object.

2. The apparatus of claim 1 further comprising an infrared camera configured to capture the plurality of overlapping images of the object.

3. The apparatus of claim 1 further comprising a gimble mechanism for mounting the high-resolution camera and the unstructured light source, the gimble mechanism enabling the high-resolution camera and the unstructured light source to be moved to a plurality of camera positions.

4. The apparatus of claim 3 further comprising a gimble controller configured to control movement of the gimble mechanism to move the high-resolution camera and the unstructured light source to the plurality of positions.

5. The apparatus of claim 1 further comprising position measurement circuitry configured to determine a position and associated data indicating the position with each of the plurality of overlapping images of the object.

6. The apparatus of claim 1, wherein the image processing circuitry further comprises a graphics processor configured to process the plurality of overlapping images of the object.

7. The apparatus of claim 1, wherein the image processing circuitry further comprises a processor configured to implement a shape-from-motion algorithm for generating the 3D image map responsive to the plurality of overlapping images of the object.

8. The apparatus of claim 1, wherein the high-resolution camera, the unstructured light source and the image processing circuitry are self-contained and do not rely upon data from the spacecraft on which the apparatus is implemented.

9. An apparatus for generating a 3D image map, comprising:
 a high-resolution camera, mounted to a spacecraft, configured to capture a plurality of overlapping images of an object from a plurality of positions about the object;
 an unstructured light source, mounted to the spacecraft, for illuminating the object with light not having a specific pattern or arrangement to capture the plurality of overlapping images of the object;
 a gimbal mechanism, mounted to the spacecraft, for mounting the high-resolution camera and the unstructured light source, the gimbal mechanism enabling movement of the high-resolution camera and the unstructured light source to a plurality of camera positions; and
 image processing circuitry associated with the spacecraft configured to process the plurality of overlapping images of the object and generate a 3D image map of the object responsive to the plurality of overlapping images of the object, wherein the image processing circuitry further comprises a processor configured to implement a shape-from-motion algorithm for generating the 3D image map responsive to the plurality of overlapping images of the object.

10. The apparatus of claim 9 further comprising an infrared camera configured to capture the plurality of overlapping images of the object.

11. The apparatus of claim 9 further comprising a gimbal controller configured to control movement of the gimbal mechanism to move the high-resolution camera and the unstructured light source to the plurality of positions.

12. The apparatus of claim 9 further comprising a position measurement circuitry configured to determine a position and associated data indicating the position with each of the plurality of overlapping images of the object.

13. The apparatus of claim 9, wherein the image processing circuitry further comprises a graphics processor configured to process the plurality of overlapping images of the object.

14. A method for generating a 3D image map for a 3D mapping system mounted to a spacecraft, comprising:
 capturing at the spacecraft a plurality of overlapping images of an object from a plurality of positions about the object using a high-resolution camera mounted to the spacecraft;
 generating light not having a specific pattern or arrangement from an unstructured light source at the spacecraft;
 illuminating the object with the light not having the specific pattern or arrangement to capture the plurality of overlapping images of the object with the unstructured light source; and
 processing at the spacecraft the plurality of overlapping images of the object to generate a 3D image map of the of the object responsive to the plurality of overlapping image of the object using image processing circuitry.

15. The method of claim 14 further comprising capturing further comprises capturing the plurality of overlapping images of the object using an infrared camera.

16. The method of claim 14 further comprising:
 mounting the high-resolution camera and the unstructured light source to a gimbal mechanism; and
 moving the high-resolution camera and the unstructured light source between a plurality of camera positions using the gimbal mechanism.

17. The method of claim 16 further comprising controlling movement of the gimbal mechanism to move the high-resolution camera and the unstructured light source to the plurality of positions using a gimbal controller.

18. The method of claim 14 further comprising a position measurement circuitry configured to determine a position and associated data indicating the position with each of the plurality of overlapping images of the object.

19. The method of claim 14, wherein the step of processing further comprises processing the plurality of overlapping images of the object using a graphics processor.

20. The method of claim 14, wherein the step of processing further comprises generating the 3D image map responsive to the plurality of overlapping images of the object using a processor configured to implement a shape-from-motion algorithm.

* * * * *